US011688208B2

United States Patent
Wang et al.

(10) Patent No.: US 11,688,208 B2
(45) Date of Patent: Jun. 27, 2023

(54) SYSTEMS AND METHODS FOR IMPROVING TASK OFFLOAD SCHEDULING IN AN EDGE-COMPUTING ENVIRONMENT

(71) Applicant: Toyota Motor Engineering & Manufacturing North America, Inc., Plano, TX (US)

(72) Inventors: Haoxin Wang, Mountain View, CA (US); BaekGyu Kim, Mountain View, CA (US)

(73) Assignee: Toyota Motor Engineering & Manufacturing North America, Inc., Plano, TX (US)

( * ) Notice: Subject to any disclaimer, the term of this patent is extended or adjusted under 35 U.S.C. 154(b) by 464 days.

(21) Appl. No.: 16/939,409

(22) Filed: Jul. 27, 2020

(65) Prior Publication Data

US 2022/0028185 A1    Jan. 27, 2022

(51) Int. Cl.
*G07C 5/00* (2006.01)
*G06F 9/48* (2006.01)
*B60W 40/09* (2012.01)
*G07C 5/08* (2006.01)

(52) U.S. Cl.
CPC ............. *G07C 5/008* (2013.01); *B60W 40/09* (2013.01); *G06F 9/4881* (2013.01); *G07C 5/0816* (2013.01)

(58) Field of Classification Search
CPC ..... G07C 5/008; G07C 5/0816; B60W 40/09; G06F 9/4881; G06F 9/5044; G06F 2209/509
See application file for complete search history.

(56) References Cited

U.S. PATENT DOCUMENTS

| 10,489,222 B2 | 11/2019 | Sathyanarayana et al. |
| 2019/0079659 A1* | 3/2019 | Adenwala ........... G06F 3/04842 |
| 2019/0116128 A1 | 4/2019 | Guo et al. |

FOREIGN PATENT DOCUMENTS

EP    3479972 A1    5/2019

OTHER PUBLICATIONS

Feng et al., "AVE: Autonomous vehicular edge computing framework with ACO-based scheduling", IEEE Transactions on Vehicular Technology, vol. 66, No. 12, Dec. 2017.

(Continued)

*Primary Examiner* — Michael V Kerrigan
(74) *Attorney, Agent, or Firm* — Christopher G. Darrow; Darrow Mustafa PC

(57) ABSTRACT

System, methods, and other embodiments described herein relate to improving scheduling tasks within an edge-computing environment. In one embodiment, a method includes, upon establishing a communication connection with a vehicle by an edge device of the edge-computing environment, collecting offloading information about the vehicle including task information describing at least a vehicle task that is to be offloaded to the edge device and context information about aspects relating to operation of the vehicle. The method includes triggering offloading of the vehicle task to the edge device in response to determining that at least the context information satisfies a scheduling threshold. The method includes providing, by the edge device, a result of executing the vehicle task to the vehicle.

20 Claims, 6 Drawing Sheets

(56) References Cited

OTHER PUBLICATIONS

Sun et al., "Adaptive Learning-Based Task Off-loading for Vehicular Edge Computing Systems", found at: arXiv:1901.05205v1 [cs IT] Jan. 16, 2019.
Madej et al. "Priority-based Fair Scheduling in Edge Computing", found at: arXiv:2001.09070v1 [cs.DC] Jan. 24, 2020.
Jiang et al. "Deep Learning Based Joint Resource Scheduling Algorithms for Hybrid MEC networks", found at: arXiv:1911.09598v1 [eess.SP]Nov. 21, 2019.
Liu et al "Computation Resource Allocation for Heterogeneous Time-Critical IoT Services in MEC", found at: arXiv:2002.04851v1 [cs NI] Feb. 12, 2020.
Feng et al. "Mobile edge computing for the Internet of vehicles: Offloading framework and job scheduling", IEEE Vehicular Technology Magazine 14.1 (2018): 28-36.

\* cited by examiner

SYSTEMS AND METHODS FOR IMPROVING TASK OFFLOAD SCHEDULING IN AN EDGE-COMPUTING ENVIRONMENT

TECHNICAL FIELD

The subject matter described herein relates, in general, to improving task scheduling, and, more particularly, to performing task scheduling in an edge-computing environment using contextual data about the task, driver, and vehicle.

BACKGROUND

As vehicles become more commonplace in daily life, requirements relating to safety and more comfortable driving experience have also arisen. For example, many vehicles now integrate new technologies, such as connected features and driving assistance systems, to facilitate with improving these features. In one aspect, integrating communications with a vehicle to provide connected vehicles may improve both safety and comfort. In general, a connected vehicle is defined as a vehicle that connects with a communication network to exchange data with cloud-based devices and/or other network-attached devices. Thus, a connected vehicle may take advantage of computing resources in the cloud to facilitate more complex determinations for safety systems, navigation, and/or other tasks that may execute on the vehicle.

In this regard, edge computing is a promising paradigm to bridge the gap between stringent computational requirements of vehicular applications and constrained computation capacity of the vehicle. However, with further development of connected vehicles, an increasing number of intelligent vehicular applications will also emerge. One of the common features of these applications is the transmission of data between the connected vehicle and an edge server. Some applications may offload partial or whole tasks to the edge server for processing. Other applications may download data from the edge server to facilitate various tasks. Thus, network traffic congestion from a multiplicity of requests may interfere with the effective use of such resources. Consequently, edge devices may encounter difficulties in regards to determining task priority when receiving a large number of tasks for processing from connected vehicles. The scheduling difficulties may result in reduced quality of service in which the edge device may execute less important tasks while critical tasks from other vehicles experience delays.

SUMMARY

In one embodiment, example systems and methods relate to a manner of improving task scheduling in an edge-computing environment. As previously noted, the more vehicles integrate advanced technologies and use edge-computing resources to facilitate the technologies, the greater the likelihood of delays due to the congestion of network traffic. Thus, without intelligently scheduling task offloading and communications between the edge-computing resources and connected vehicles, the connected vehicles may not be able to adequately meet onboard computational loads. Consequently, the connected vehicles may not operate as intended when network congestion is present.

Therefore, in various embodiments, a disclosed approach involves using contextual information as a cue to improve the scheduling of offloading tasks in a way that efficiently uses available resources. For example, in at least one arrangement, a scheduling system within an edge-computing device (e.g., an edge server) collects information from a connected vehicle. The connected vehicle is, for example, a vehicle that communicates with the edge-computing device and/or other connected devices to exchange information and perform various tasks. Thus, the connected vehicle may communicate with the edge-computing device to offload computing tasks, acquire additional information, and so on.

In any case, the connected vehicle generally acquires various contextual information as part of operating. That is, as the vehicle is functioning, the vehicle may collect information about a surrounding environment, operation of the vehicle, behaviors of the driver, task information, and so on. Knowledge about the different aspects of the vehicle can provide insights or contextual cues to the edge-computing device to provide for improving the scheduling of offloading. Thus, in one or more arrangements, the scheduling system acquires the noted data from the connected vehicle as offloading information. Accordingly, the scheduling system can trigger the offloading of a task from the vehicle according to the offloading information, instead of directly scheduling the task without consideration of the context. It should be appreciated that the scheduling generally involves determining an optimal timing to offload the task (i.e., task-related data) and/or download information to the vehicle. Thus, the scheduling system considers characteristics of the offloading information, such as awareness of the driver in relation to the operation of the vehicle, the complexity of the surrounding environment, current task load of the vehicle, and so on.

By considering the noted aspects, the scheduling system can determine an immediacy/priority of the request and can then improve the scheduling of the task in relation to tasks from other vehicles. In this way, the scheduling system improves the use of available resources at the edge-computing device by using available contextual cues to better inform the scheduling process.

In one embodiment, a scheduling system for improving scheduling tasks within an edge-computing environment is disclosed. The tracking system includes one or more processors and a memory communicably coupled to the one or more processors. The memory stores a sensor module including instructions that when executed by the one or more processors cause the one or more processors to, upon establishing a communication connection with a vehicle by an edge device of the edge-computing environment, collect offloading information about the vehicle including task information describing at least a vehicle task that is to be offloaded to the edge device and context information about aspects relating to operation of the vehicle. The memory stores a determination module including instructions that when executed by the one or more processors cause the one or more processors to trigger offloading of the vehicle task to the edge device in response to determining that at least the context information satisfies a scheduling threshold. The determination includes instructions to provide, by the edge device, a result of executing the vehicle task to the vehicle.

In one embodiment, a non-transitory computer-readable medium for improving scheduling tasks within an edge-computing environment and including instructions that, when executed by one or more processors, cause the one or more processors to perform one or more functions is disclosed. The instructions include instructions to, upon establishing a communication connection with a vehicle by an edge device of the edge-computing environment, collect offloading information about the vehicle including task information describing at least a vehicle task that is to be offloaded to the edge device and context information about aspects relating to operation of the vehicle. The instructions include instructions to trigger offloading of the vehicle task to the edge device in response to determining that at least the context information satisfies a scheduling threshold. The instructions include instructions to provide, by the edge device, a result of executing the vehicle task to the vehicle.

In one embodiment, a method for improving scheduling tasks within an edge-computing environment is disclosed. In one embodiment, the method includes, upon establishing a communication connection with a vehicle by an edge device of the edge-computing environment, collecting offloading information about the vehicle including task information describing at least a vehicle task that is to be offloaded to the edge device and context information about aspects relating to operation of the vehicle. The method includes triggering offloading of the vehicle task to the edge device in response to determining that at least the context information satisfies a scheduling threshold. The method includes providing, by the edge device, a result of executing the vehicle task to the vehicle.

BRIEF DESCRIPTION OF THE DRAWINGS

The accompanying drawings, which are incorporated in and constitute a part of the specification, illustrate various systems, methods, and other embodiments of the disclosure. It will be appreciated that the illustrated element boundaries (e.g., boxes, groups of boxes, or other shapes) in the figures represent one embodiment of the boundaries. In some embodiments, one element may be designed as multiple elements or multiple elements may be designed as one element. In some embodiments, an element shown as an internal component of another element may be implemented as an external component and vice versa. Furthermore, elements may not be drawn to scale.

DETAILED DESCRIPTION

Figure 1:
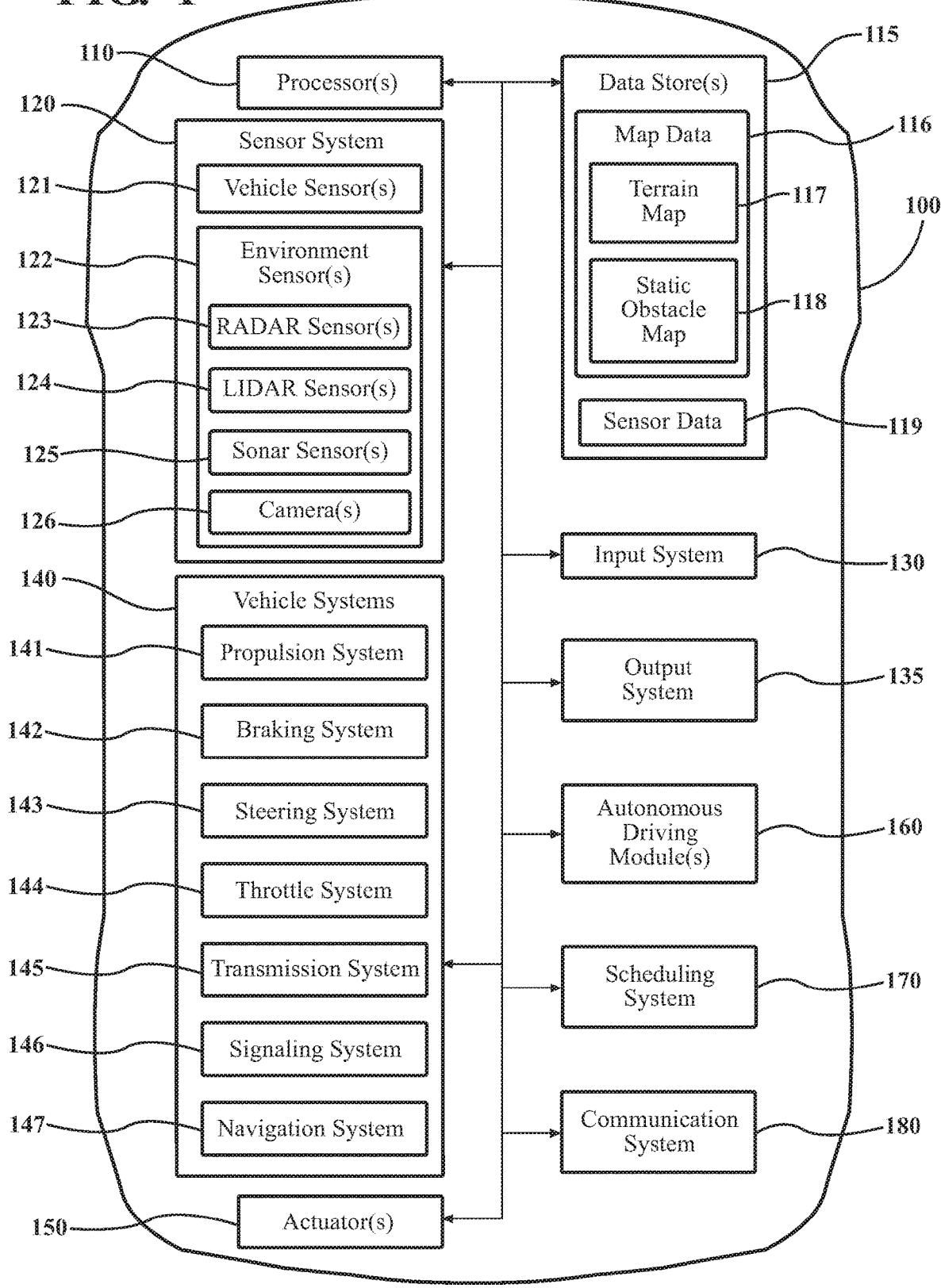
FIG. 1 illustrates one embodiment of a vehicle within which systems and methods disclosed herein may be implemented.

Systems, methods, and other embodiments associated with a manner of improving task scheduling in an edge-computing environment are disclosed herein. As previously noted, the more vehicles that integrate advanced technologies and use edge-computing resources to facilitate the technologies, the greater the likelihood of delays due to network traffic. As such, connected vehicles may not be able to adequately meet onboard computational loads when the ability to efficiently offload tasks is frustrated by network congestion. Consequently, the connected vehicles may not operate as intended when network congestion is present.

Therefore, in various embodiments, a disclosed approach involves using contextual information to improve the scheduling of offloading tasks in a way that efficiently uses available resources. For example, in at least one arrangement, a connected vehicle communicates with an edge-computing device and/or other connected devices to exchange information and perform various tasks. Thus, the connected vehicle may communicate with the edge-computing device to offload computing tasks, acquire additional information, and so on. In any case, the connected vehicle generally acquires various contextual information using onboard systems, such as driving assistance/autonomous driving systems, vehicle monitoring, driver monitoring, and so on. Accordingly, the vehicle may collect information about a surrounding environment, operation of the vehicle, behaviors of the driver, task information, and so on.

Knowledge about the different aspects can provide insights or contextual cues to the edge-computing device about how to schedule offloading since this information can be indicative of increased computing loads or the importance of a specific task that may be processed in a more efficient manner by the edge-computing device. Thus, in one or more arrangements, the scheduling system acquires the noted data from the connected vehicle as offloading information. Thereafter, the scheduling system can trigger the offloading of a task from the vehicle according to the offloading information. For example, the scheduling system may assess the offloading information to determine whether a driver is not currently aware and elevate the priority of a safety task for offloading in order to facilitate the safe operation of the vehicle. In further examples, the scheduling system may determine that the vehicle is to navigate through a complex intersection, is encountering a high computational load, or otherwise satisfies a scheduling threshold that indicates one or more tasks of the vehicle are to be prioritized for scheduling.

It should be appreciated that the scheduling generally involves determining a time to offload the task (i.e., task-related data) and/or download information to the vehicle. Thus, the scheduling system considers characteristics of the offloading information to determine the priority and trigger the offloading. By considering the noted aspects, the scheduling system can determine an immediacy of the request and can then improve the scheduling of the task in relation to other queued tasks. In this way, the scheduling system improves the use of available resources at the edge-computing device by using available contextual cues to better inform the scheduling process.

Referring to FIG. 1, an example of a vehicle 100 is illustrated. As used herein, a "vehicle" is any form of powered transport. In one or more implementations, the vehicle 100 is an automobile. While arrangements will be described herein with respect to automobiles, it will be understood that embodiments are not limited to automobiles. In some implementations, the vehicle 100 may be any device that, for example, transports passengers. Moreover, in yet further approaches, the noted systems and methods disclosed herein may be implemented as part of other entities such as electronic devices that are not associated with a particular form of transport but are instead embedded as part of a mobile electronic device that can be, for example, carried by an individual and that may function independently or in concert with additional systems (e.g., sensors) of other devices.

In any case, the vehicle 100 also includes various elements. It will be understood that in various embodiments, it may not be necessary for the vehicle 100 to have all of the elements shown in FIG. 1. The vehicle 100 can have any combination of the various elements shown in FIG. 1. Further, the vehicle 100 can have additional elements to those shown in FIG. 1. In some arrangements, the vehicle 100 may be implemented without one or more of the elements shown in FIG. 1. While the various elements are shown as being located within the vehicle 100 in FIG. 1, it will be understood that one or more of these elements can be located external to the vehicle 100. Further, the elements shown may be physically separated by large distances. For example, as discussed, one or more components of the disclosed system can be implemented within the vehicle 100, while further components of the system are implemented within an edge-computing environment, as discussed further subsequently.

Some of the possible elements of the vehicle 100 are shown in FIG. 1 and will be described along with subsequent figures. However, a description of many of the elements in FIG. 1 will be provided after the discussion of FIGS. 2-6 for purposes of the brevity of this description. Additionally, it will be appreciated that for simplicity and clarity of illustration, where appropriate, reference numerals have been repeated among the different figures to indicate corresponding or analogous elements. In addition, the discussion outlines numerous specific details to provide a thorough understanding of the embodiments described herein. Those of skill in the art, however, will understand that the embodiments described herein may be practiced using various combinations of these elements. In any case, as illustrated in the embodiment of FIG. 1, the vehicle 100 includes a scheduling system 170 that is implemented to perform methods and other functions as disclosed herein relating to improving the scheduling of task offloading.

As will be discussed in greater detail subsequently, the scheduling system 170, in various embodiments, may be implemented partially within the vehicle 100, or another entity, and may further exchange communications with additional aspects of the system 170 that are remote from the vehicle 100 in support of the disclosed functions. For example, in at least one approach, the scheduling system 170 is implemented within an edge-computing device (e.g., a server) that is remote from the vehicle 100, while the vehicle 100 may implement a separate instance or client of the scheduling system 170.

Moreover, the scheduling system 170, as provided for within the vehicle 100, functions in cooperation with a communication system 180. In one embodiment, the communication system 180 communicates according to one or more communication standards. For example, the communication system 180 can include multiple different antennas/transceivers and/or other hardware elements for communicating at different frequencies and according to respective protocols. The communication system 180, in one arrangement, communicates via communications protocol such as a WiFi, DSRC, V2I, V2V, or another suitable protocol for communicating between the vehicle 100 and an edge-computing device. Moreover, the communication system 180, in one arrangement, further communicates according to a protocol, such as global system for mobile communication (GSM), Enhanced Data Rates for GSM Evolution (EDGE), Long-Term Evolution (LTE), 5G, or another communication technology that provides for the vehicle 100 communicating with various remote devices (e.g., edge server). In any case, the system 170 can leverage various wireless communications technologies to provide communications to an edge-based device. Thus, while FIG. 2 generally illustrates the system 170 as being self-contained, in various embodiments, the scheduling system 170 may be implemented within multiple separate devices some of which may be remote from the vehicle 100.

Figure 2:
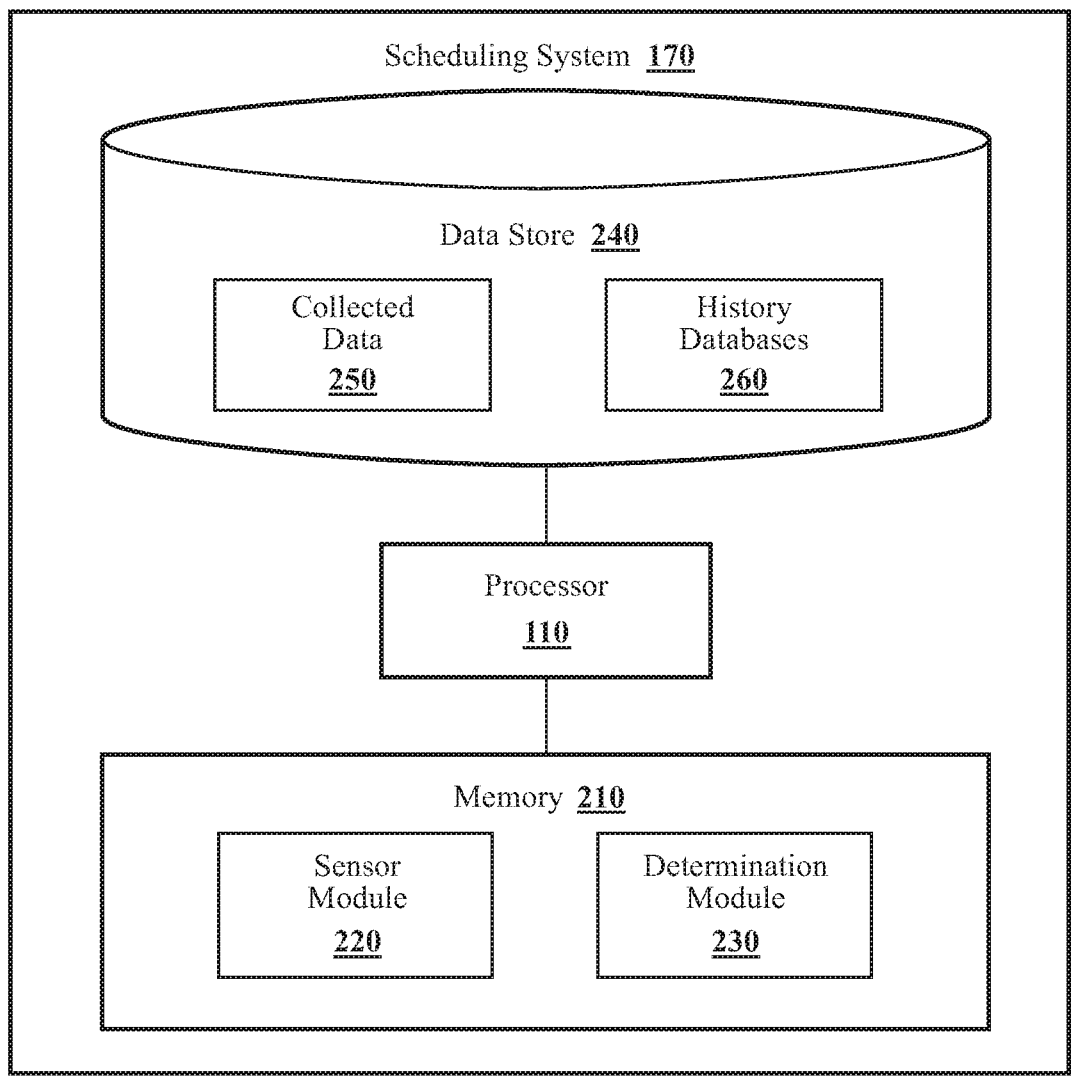
FIG. 2 illustrates one embodiment of a scheduling system associated with improving the scheduling of tasks offloaded from connected vehicles.

With reference to FIG. 2, one embodiment of the scheduling system 170 is further illustrated. The scheduling system 170 is shown as including a processor 110 from the vehicle 100 of FIG. 1. Accordingly, the processor 110 may be a part of the scheduling system 170, the scheduling system 170 may include a separate processor from the processor 110 of the vehicle 100 or the scheduling system 170 may access the processor 110 through a data bus or another communication path. In further aspects, the processor 110 is a cloud-based resource. Thus, the processor 110 may communicate with the scheduling system 170 through a communication network or may be co-located with the scheduling system 170. In one embodiment, the scheduling system 170 includes a memory 210 that stores a sensor module 220 and a determination module 230. The memory 210 is a random-access memory (RAM), read-only memory (ROM), a hard-disk drive, a flash memory, or other suitable memory (either volatile or non-volatile) for storing the modules 220 and 230 and/or other information used by the scheduling system 170. The modules 220 and 230 are, for example, computer-readable instructions within the physical memory 210 that, when executed by the processor 110, cause the processor 110 to perform the various functions disclosed herein.

Figure 3:
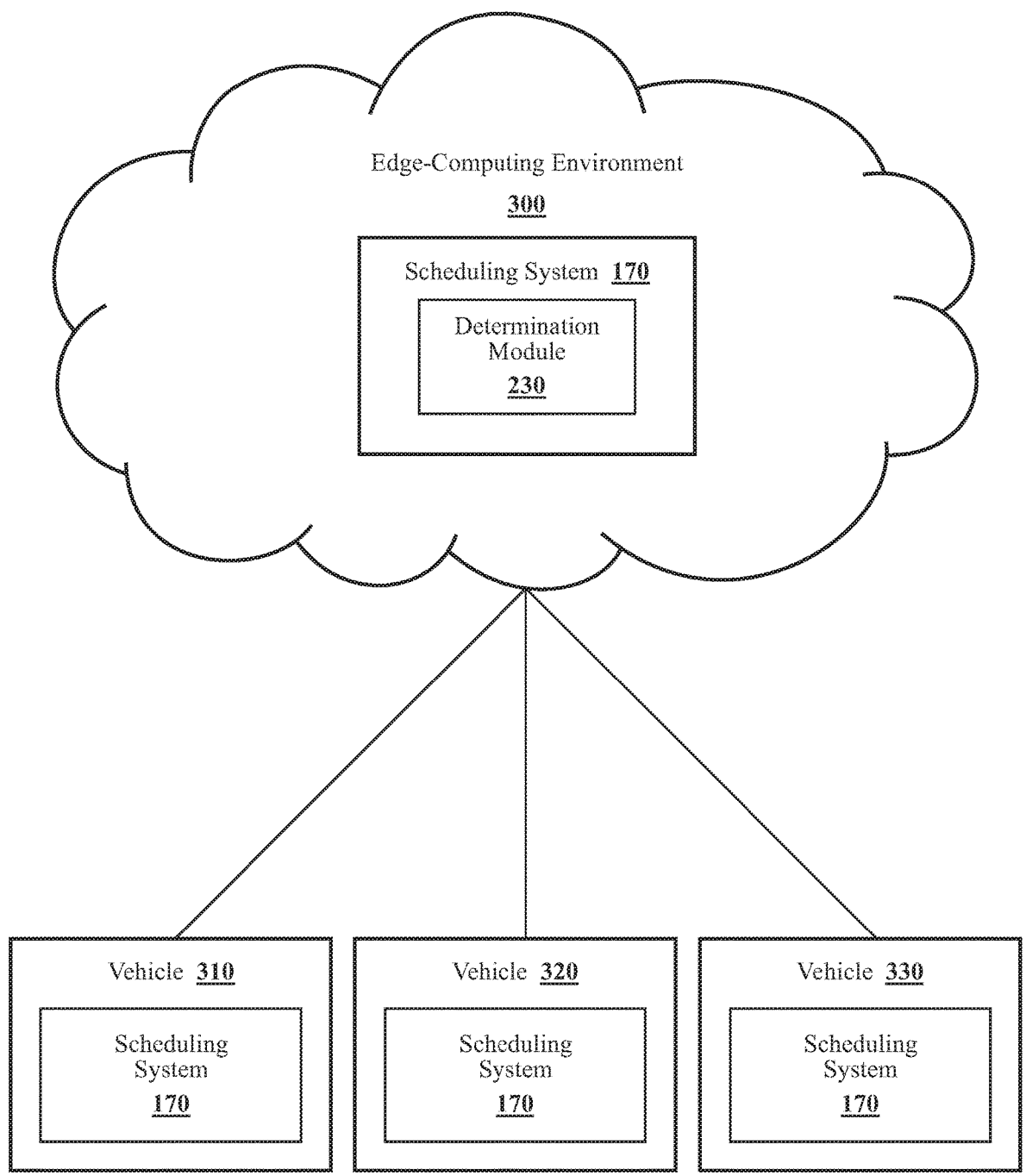
FIG. 3 illustrates a diagram of a scheduling system in within an edge-computing environment.

As previously noted, the scheduling system 170 may be further implemented as a cloud/edge-based system that functions within an edge-computing environment 300, as illustrated in relation to FIG. 3. That is, for example, the scheduling system 170 may acquire collected data 250 from various entities, such as vehicles implementing the scheduling system 170, and execute as an edge-based resource that is comprised of devices (e.g., servers) remote from the vehicle 100 to perform tasks on behalf of the vehicle 100. In one or more approaches, the edge-computing environment 300 may use observations from multiple different vehicles to determine priorities of separate tasks and separately execute the tasks according to the respective priorities.

Accordingly, the scheduling system 170 within the edge-computing environment may communicate with various entities (e.g., vehicles 310, 320, and 330) that are within a same geographic area (e.g., traveling on a same roadway). In one approach, the cloud-based scheduling system 170 collects the collected data 250 from components or separate instances of the system 170 that are integrated with the vehicles 310-330. The entities that implement the scheduling system 170 within the edge-computing environment 300 may vary beyond transportation-related devices and encompass road-side units (e.g., statically mounted cameras, LiDARs, and/or other sensor-based systems), mobile devices (e.g., smartphones), traffic lights/signs and so on. Thus, the set of remote entities that function in coordination with the edge-based environment 300 may be varied.

Of course, the entities, such as the vehicles 310-330, may communicate with the edge-computing environment 300 using various forms of communications to provide the collected data 250 and/or to acquire determinations generated by the edge-computing environment 300. As such, the cloud-based aspects of the scheduling system 170 may process various portions of the collected data 250 for the vehicles 310-330 to perform task scheduling and determine priorities for offloading and downloading of tasks/data. In further aspects, the entity-based components of the system 170 may perform part of the processing while the edge-computing environment 300 may handle a remaining portion or function to validate the results of the entity-based instances of the scheduling system 170 (i.e., within vehicles 310-330). It should be appreciated that the apportionment of the processing between the remote entities and the edge-computing environment 300 may vary according to different implementations and particular tasks that are to be offloaded. Additionally, it should be appreciated that while three separate entities are illustrated along with FIG. 3, the edge-computing environment 300 generally communicates with a varying number of entities according to movement through a geographic area covered by separate edge devices of the edge-computing environment 300.

Continuing with FIG. 2 and a general embodiment of the scheduling system 170 from the perspective of the vehicle 100, in one or more arrangements, the sensor module 220 includes instructions that function to control the processor 110 to acquire collected data 250. In at least one aspect, the sensor module 220 acquires the collected data 250 about aspects in a surrounding environment of the vehicle 100 to facilitate the operation of various systems of the vehicle 100, such as the autonomous driving module 160 (e.g., automated driving assistance systems (ADAS), semi-autonomous systems, fully autonomous systems, etc.), a navigation application, and so on. In further instances, the sensor module 220 acquires the collected data 250 about the operation of the vehicle 100 itself (e.g., trajectory data, system status information, diagnostic data, etc.), about current computational loads of processing components on the vehicle 100, and other relevant operating characteristics that may inform the scheduling of tasks with the edge-computing environment 300.

In addition to collecting external observations of the vehicle 100, and data about the vehicle 100 itself, the sensor module 220 may also acquire the collected data 250 about a driver of the vehicle 100. Accordingly, the sensor module 220 may form the collected data 250 into offloading information that the sensor module 220 provides to an edge-computing device of the edge-computing environment 300 for the purpose of informing the edge-computing device about a current state of the vehicle 100 so that the edge-computing device (i.e., an instance of the scheduling system 170 in the edge-computing device) can make informed decisions about when to offload tasks from the vehicle 100.

In any case, as discussed herein, the offloading information that the sensor module 220 generates from the collected data 250 generally includes task information and context information that is comprised of driver behavior information and environmental information. As an additional explanation of each separate aspect of the offloading information, consider the following discussion.

With reference to the driver behavior information, in at least one approach, the sensor module 220 generally includes instructions that function to control the processor 110 to retrieve data from sensors of a sensor system 120 of the vehicle 100. In other words, the sensor module 220 includes instructions to acquire driver behavior information that characterizes a present mental state of the driver, present actions of the driver, where a gaze of the driver may be directed, autonomic responses of the driver, biological responses/conditions of the driver, and so on. It should be appreciated that the present disclosure provides an exemplary listing of aspects associated with the driver that the system can monitor to produce the driver behavior information; however, this listing is not to be construed as limiting and is provided as an exemplary list of possibilities for purposes of this discussion.

Accordingly, by way of example, the driver behavior information can include information about a direction of a gaze, a path/track of the gaze, heart rate, blood pressure, respiratory function, blood oxygen levels, perspiration levels, pupil dilation/size, brain activity (e.g., EEG data), salivation information, hand/arm positions, foot/leg positions, a general orientation of the operator in the vehicle 100 (e.g., forward-facing, rear-facing, etc.), seat position, rate of movement, facial feature movements (e.g., mouth, blinking eyes, moving head, etc.), and so on.

Additionally, the sensor module 220 can determine the driver behavior information in multiple different ways depending on a particular implementation. In one embodiment, the sensor module 220 communicates with various sensors of the sensor system 120 including one or more of: camera(s) 126 (e.g., for gaze/eye tracking), heart rate monitor sensors, infrared sensors, seat position sensors, and so on. In one embodiment, the sensors are located within a passenger compartment of the vehicle 100 and can be positioned in various locations in order to acquire information about the noted aspects of the driver and/or aspects related to the driver. Furthermore, the sensor system 120 can include multiple redundant ones of the sensors in order to, for example, improve accuracy/precision of collected driver behavior information. Moreover, while direct observations of the driver are useful in producing the driver behavior information, the sensor module 220 may also leverage further data about inputs provided by the driver to the vehicle 100. For example, the sensor module 220 can acquire information about speed, acceleration rates, rates of turn, braking, and so on. In this way, the sensor module 220 can determine aspects relating to behaviors of the driver, such as an aggressiveness of the driver, awareness/vigilance of the driver, and so on.

Turning to the environmental information, the sensor module 220 generally includes instructions that cause the processor 110 to control one or more sensors of the vehicle 100 to generate an observation about the surrounding environment. Broadly, an observation, as acquired by the sensor module 220, is information about a particular roadway segment and objects present on the roadway segment as perceived by at least one sensor. Thus, the observation, which may also be broadly referred to as information about a roadway segment, is generally a group of one or more data that are processed into a meaningful form.

Accordingly, the sensor module 220, in one embodiment, controls respective sensors of the vehicle 100 to provide the data inputs in the form of collected data 250. The sensor module 220 may further process the collected data 250 into separate observations of the surrounding environment. For example, the sensor module 220, in one approach, fuses data from separate sensors to provide an observation about a particular aspect of the surrounding environment. By way of example, the collected data 250 itself, in one or more approaches, may take the form of separate images, radar returns, LiDAR returns, and so on. The sensor module 220 may derive determinations (e.g., location, trajectory, etc.) from the collected data 250 and fuse the data for separately identified aspects of the surrounding environment, such as lane markers, surrounding vehicles, and so on. The sensor module 220 may further extrapolate the collected data 250 into an observation by, for example, correlating the separate instances of sensor data into a meaningful observation about the object beyond an instantaneous data point. For example, the sensor module 220 may track a surrounding vehicle over many data points to provide a trajectory or may characterize a lane marker over a defined distance. As a further example, the sensor module 220 may derive locations of roadway elements, conditions of features, and so on.

Additionally, while the sensor module 220 is discussed as controlling the various sensors to provide the collected data 250, in one or more embodiments, the module 220 can employ other techniques that are either active or passive to acquire the collected data 250. For example, the sensor module 220 may passively sniff the collected data 250 from a stream of electronic information provided by the various sensors or other modules/systems in the vehicle 100 to further components within the vehicle 100. Moreover, as noted, the sensor module 220 can undertake various approaches to fuse data from multiple sensors when providing the collected data 250. Thus, the collected data 250, in one embodiment, represents a combination of perceptions acquired from multiple sensors.

Of course, depending on the sensors that the vehicle 100 or other entity includes, the available collected data 250 that the scheduling system 170 can harvest may vary. As one example, according to a particular implementation, the vehicle 100 may include different types of cameras or placements of multiple cameras. In an additional aspect, the environmental information may also, or alternatively, define aspects relating to a state of the vehicle 100 and/or a state of communications with the edge-computing environment 300. For example, the environmental information may define buffered data size, wireless uplink/downlink data rates, edge server workload, and so on. As such, the sensor module 220 may, in one or more approaches, be configured to adapt to different electronic inputs depending on the availability of such information. In any case, the sensor module 220 acquires the sensor data and generates the collected data 250 therefrom. In various approaches, the sensor module 220 may then communicate the collected data 250 to the edge-computing environment 300 as described further subsequently.

Turning to the task information, in one or more arrangements, the sensor module 220 monitors applications that are currently executing on one or more processors (e.g., processor 110) in the vehicle 100. It should be appreciated that while a single processor is shown and discussed, the separate systems/modules of the vehicle 100, in various implementations, may implement separate processors to execute applications/tasks. In any case, the sensor module 220 can monitor the applications and associated processors to determine aspects relating to the operation of the vehicle 100, such as resource requirements, features of the applications, the current computational load of the processors, current memory availability, and so on. As a general premise, the sensor module 220 monitors aspects about the execution of the applications that may influence the efficiency of execution and whether a specific task of an application should be offloaded to an edge-computing device.

Moreover, the task information may further specify the requirements of an associated vehicle application, such as network downlink/uplink bandwidth, computational requirements, and so on. In still further aspects, the task information identifies features of the application, such as whether the application is associated with a safety function of the vehicle 100, entertainment, a driving monitor, etc. For example, in various implementations, a specific task may have a high priority due to a current complex driving situation, safety of the vehicle, aggressiveness of the driver, lack of awareness by the driver, and so on. The high priority may be due to an immediacy of the task, a general importance of the task, a desired accuracy of the task, and so on. That is, by way of example, in certain circumstances, the edge-computing device may be better suited to produce a result more quickly or with higher accuracy due to, for example, additional computing resources available in comparison to the vehicle 100. In any case, the sensor module 220 acquires the collected data including task information, and the context information.

When acquiring the environmental information, the sensor module 220 may acquire various electronic inputs that originate from the vehicle 100, which may be stored in a data store 240 of the scheduling system 170 as the collected data 250. Accordingly, in one embodiment, the scheduling system 170 includes the data store 240. The data store 240 is, in one embodiment, an electronic data structure (e.g., a database) stored in the memory 210 or another electronic memory and that is configured with routines that can be executed by the processor 110 for analyzing stored data, providing stored data, organizing stored data, and so on. Thus, in one embodiment, the data store 240 stores data used by the modules 220 and 230 in executing various functions. In one embodiment, the data store 240 includes the collected data 250 along with, for example, one or more history databases 260, and/or other information that is used by the modules 220 and 230.

It should be appreciated that while the data store 240 is shown as including the collected data 250 and the history databases 260, separate instances of the scheduling system 170 may implement the data store 240 to include different sets of information. For example, in an arrangement where the scheduling system 170 is implemented within the vehicle 100, the data store may include the collected data 250 but may not include the history databases 260 since the edge-computing device generally leverages the history databases 260 while the vehicle 100 does not. In any case, the scheduling system 170 includes the data store 240 as a means of electronic storage for various electronic data.

Returning to the sensor module 220, in one or more arrangements, the sensor module 220, from the perspective of the vehicle 100, communicates the offloading information (i.e., the collected data 250) to the edge-computing device. The inducement of the communication may vary depending on the particular implementation. For example, in one approach, the sensor module 220 communicates the offloading information at regular intervals. In further implementations, the sensor module 220 communicates the offloading information as part of an offloading request (i.e., a request for the edge-computing device to execute a task). In yet a further embodiment, the sensor module 220 communicates the offloading information upon entering an area of coverage of the edge-computing device and establishing communications with the edge-computing device. Thus, the sensor module 220 may provide the offloading information as part of a handover from another device, as part of a discovery handshake, or according to another mechanism. In any case, the sensor module 220 within the vehicle 100 communicates the offloading information to a separate instance of the sensor module 220 within the edge-computing device as previously illustrated in FIG. 3.

Continuing from the perspective of the edge-computing device that implements a separate instance of the scheduling system 170, the scheduling system 170 acquires the offloading information from the vehicle 100. As noted, the offloading information may be provided at regular intervals or upon a request to offload a task. Accordingly, the sensor module 220 at the edge device acquires the offloading information either independently or in combination with a task offloading request. The task offloading request may specify a task that the vehicle 100 desires to offload to the edge device for processing and may also include relevant information for processing the task, such as sensor data, application data, and so on. Accordingly, upon establishing communications with the vehicle 100, the scheduling system 170 of the edge device acquires the offloading information and/or task offloading requests from which the determination module 230 may schedule the tasks.

Continuing with FIG. 2 from the perspective of the edge-computing device implementing the scheduling system 170, in one embodiment, the determination module 230 includes instructions that, when executed by the one or more processors 110, cause the one or more processors 110 to trigger offloading of a vehicle task to the edge device. To achieve the triggering of the offloading, the determination module 230 undertakes analysis of the offloading information to determine whether at least the context information satisfies a scheduling threshold. In various approaches, the scheduling system 170 may define the scheduling threshold in different ways. For example, in at least one arrangement, the scheduling system 170 defines the scheduling threshold according to various aspects or events associated with the offloading information.

By way of example, the scheduling system 170 may define separate scheduling thresholds (also referred to as triggers herein) by which the determination module 230 can analyze the offloading information. In one example, the scheduling threshold defines aspects about the environment information that induce the determination module 230 to trigger offloading, such as when the buffered data size of a vehicle is over an uplink defined level and/or a downlink data rate is below a download defined level. This determination may be further adapted according to other congruent occurrences, such as the vehicle 100 navigating through a dangerous traffic pattern, increased traffic, and so on. In any case, triggering the offloading in such a situation facilitates more efficient operation of the vehicle systems.

As a further example of the scheduling threshold, in one or more aspects, the scheduling system 170 defines the scheduling threshold according to driver behaviors. That is, a "pre-behavior" of the driver from prior to the scheduling may be included with the offloading information. The determination module 230 may analyze the behavior to determine whether the behavior indicates a behavior state of the driver satisfies the scheduling threshold. Thus, the scheduling threshold may indicate a level of aggressiveness, mental awareness/vigilance of the driver, or another state that is indicative of a situation in which offloading can improve the safety of the vehicle 100. As one example, when the determination module 230 determines that a level of aggressiveness satisfies (e.g., exceeds) the scheduling threshold, the determination module 230 may trigger offloading for an intelligent driving application that monitors the driver and provides alarms about behaviors and/or to a driving assistance system that performs automatic braking and crash avoidance. In a further arrangement, the determination module 230 may compare the pre-behavior of the driver with other drivers as determined from the history database 260 for similar circumstances. Thus, the determination module 230 may use the history database 260 to define the scheduling threshold by identifying normal behaviors of the driving conditions and comparing behaviors of the present driver with the behaviors of the other drivers. In this way, the scheduling system 170 can improve the operation of the vehicle 100 under different circumstances.

In further aspects, the scheduling threshold may define different trajectories of the vehicle (e.g., X mph above a speed limit), weather conditions (e.g., snow/ice), vehicle condition (e.g., mechanical failures), driver states (e.g., health conditions, awareness levels, agitation level, sleeping, etc.), and so on. Moreover, the determination module 230 may log the offloading information in the history database 260 along with subsequent offloading information from the vehicle 100 to develop a history of information about the vehicle 100. The history information may include changes in operation of the vehicle 100 as a result of offloading a task. Thus, the scheduling system 170 may use the history database 260 as a source of information about the efficacy of offloading tasks for different sets of offloading information. As such, the scheduling system 170 can correlate the pre and post offloading information with tasks that are being offloaded to identify instances in which the offloading proves to cause a measurable difference in the functioning of the vehicle 100. These instances can further inform the definition of the scheduling threshold by identifying which conditions applied as scheduling thresholds result productive prioritization of task offloading through triggering the offloading, as discussed herein.

In any case, the determination module 230 uses the scheduling threshold to determine when to schedule the task for offloading. That is, when the determination module 230 determines that the offloading information satisfies the scheduling threshold, the determination module 230, in one or more embodiments, then triggers the task to offload. As used herein, triggering the offloading of the task generally includes scheduling a time for the vehicle 100 to provide the task to the edge device. In further embodiments, the determination module 230 may further schedule the execution of the task and/or schedule a time for downloading results of the execution of the task or simply a time to download other data, such as high-definition map data. Accordingly, the edge device that implements the scheduling system 170 may provide a communication to the vehicle 100 indicating the time for which the vehicle 100 is scheduled to provide the task.

Figure 4:
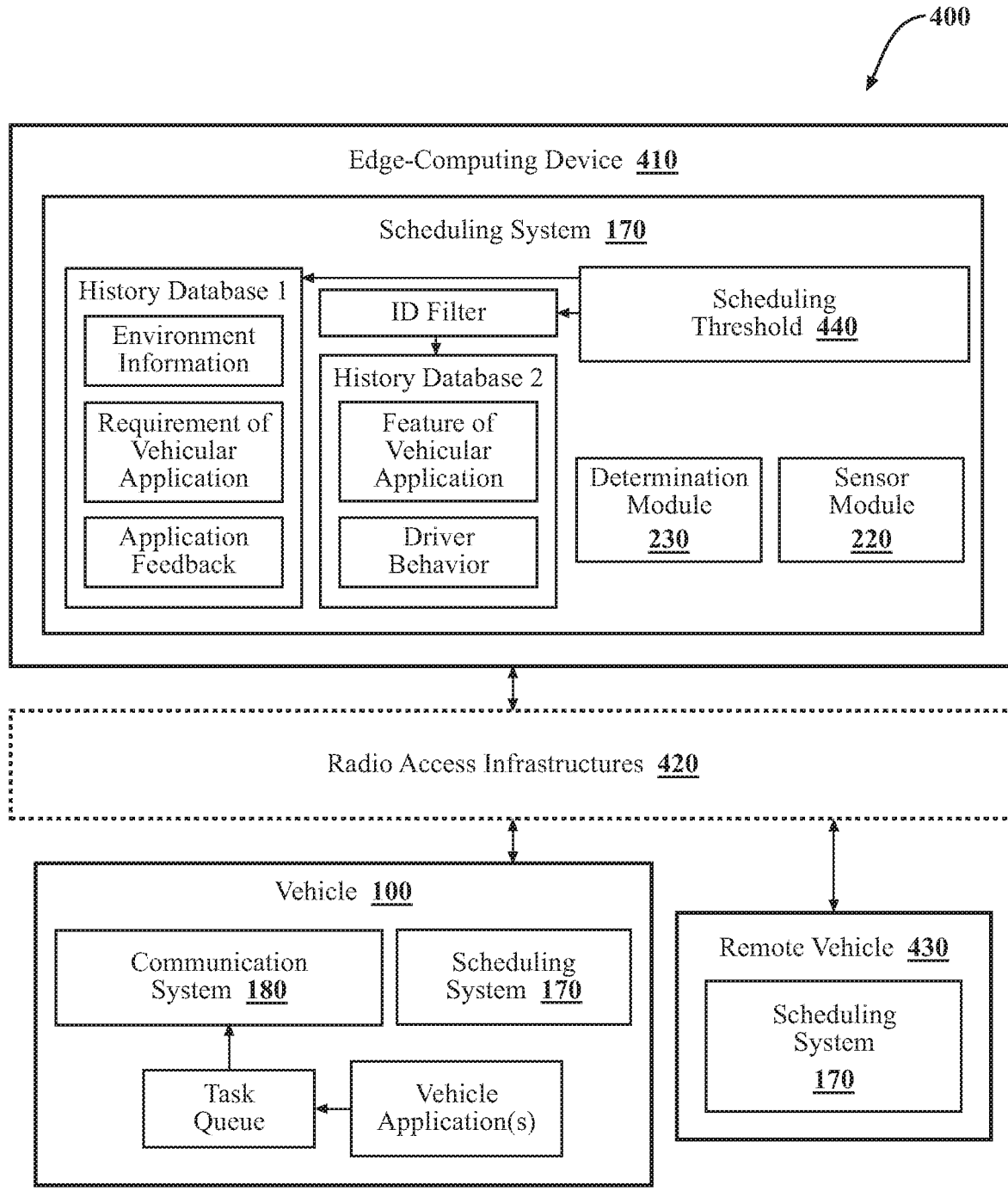
FIG. 4 illustrates one example of an edge-computing device implementing a scheduling system.

With reference to FIG. 4, an additional implementation of an edge-computing environment 400 is further illustrated. As shown, the edge-computing environment 400 includes an edge computing device 410 that may communicate via a radio access infrastructure 420. The radio access infrastructure may take different forms and may include multiple different means of communicating wirelessly that can be used together. In any case, the edge-computing device 410 uses the infrastructure 420 to communicate with the vehicle 100 and other entities, such as a remote vehicle 430. It should be appreciated that each separate entity, as discussed herein, includes an instance of the scheduling system 170.

The edge-computing device 410 may be an edge server or other computing resource that is part of the edge-computing environment 400. In general, the edge-computing device 410 may perform computing tasks on behalf of entities communicating through the infrastructure 420, such as the vehicle 100 and other entities (e.g., remote vehicle 430). In further aspects, the edge-computing device 410 may arbitrate task offloading on behalf of further devices (e.g., edge servers) within the edge-computing environment 400 or, more broadly, within a cloud-computing environment of which the edge-computing environment 400 is a part.

As illustrated in FIG. 4, the vehicle 100 includes vehicle applications and a task queue in addition to elements that have been previously noted. The vehicle applications are applications executing within one or more systems of the vehicle 100 that include infotainment, machine perception, driving assistance systems, navigation, and so on. The task queue, in one or more arrangements, may manage the execution of the applications as tasks for a computing resource. Thus, the computing resource may be a local resource of the vehicle 100 or a resource of the edge-computing environment, such as the edge-computing device 410. Accordingly, the scheduling system 170 leverages the communication system 180 to provide the offloading information via the infrastructure 420 to the edge-computing device 410. Beyond the offloading information, the scheduling system 170 may communicate specific offload requests for a task. That is, whereas the offloading information may be provided at different times, such as when the communication system 180 initially establishes communications with the edge-computing device 410, the offload request may be provided according to when a particular task in the task queue is ready to offload. Of course, in various approaches, the offload request may also include the offloading information.

The scheduling system 170 within the edge-computing device 410 then acquires the offloading information along with task information in the form of an offload request. From this information, the determination module 230 may assess scheduling threshold 440 to determine whether to trigger the offloading of the task. Moreover, as further shown in FIG. 4, the history database 260 is expanded into two separate examples including separate data elements. History database 1 illustrates an example of information that may be utilized to assess a first trigger of the scheduling threshold 440, whereas history database 2 illustrates an example of information that may be used to assess a second trigger. It should be appreciated that reference to a first and a second trigger is generally used to reference separate sets of information that may satisfy the scheduling threshold 440. Thus, as shown with history database 1, environment information, requirements of a vehicular application, and application feedback from prior scheduling events may be used to determine whether the same data from the offloading information satisfies the scheduling threshold 440.

Similarly, history database 2 indicates driver behavior information and a feature of vehicular application (e.g., type of application, such as safety, infotainment, etc.). Reference to ID filter for history database 2 denotes that the scheduling system 170 may filter the database to identify prior observations of the specific driver of the vehicle 100 and/or observations of similar drivers (e.g., similar demographic) to determine whether the driver is behaving aggressively, erratically, with a lack of awareness or is operating the vehicle 100 normally. Thus, the scheduling threshold 440 may simply indicate that the offloading is to be triggered when the behavior is aggressive, which is then determined according to the noted comparison. If the scheduling system 170 determines that either subset of information from the offloading information satisfies the scheduling threshold 440, then the scheduling system 170 proceeds by determining a time for the offloading of the task. It should be appreciated that determining a time may include comparing a priority of the task from the vehicle 100 with other tasks that are queued from other entities. Thus, while the task from the vehicle 100 may be of a relatively high importance, tasks from other entities may still have priority, which is why the task is scheduled as opposed to being immediately uploaded. In addition to scheduling the offloading, the scheduling system 170 may further schedule a time slot for downloading a result of executing the task in order to more efficiently use resources of the edge-computing environment 400.

Figure 5:
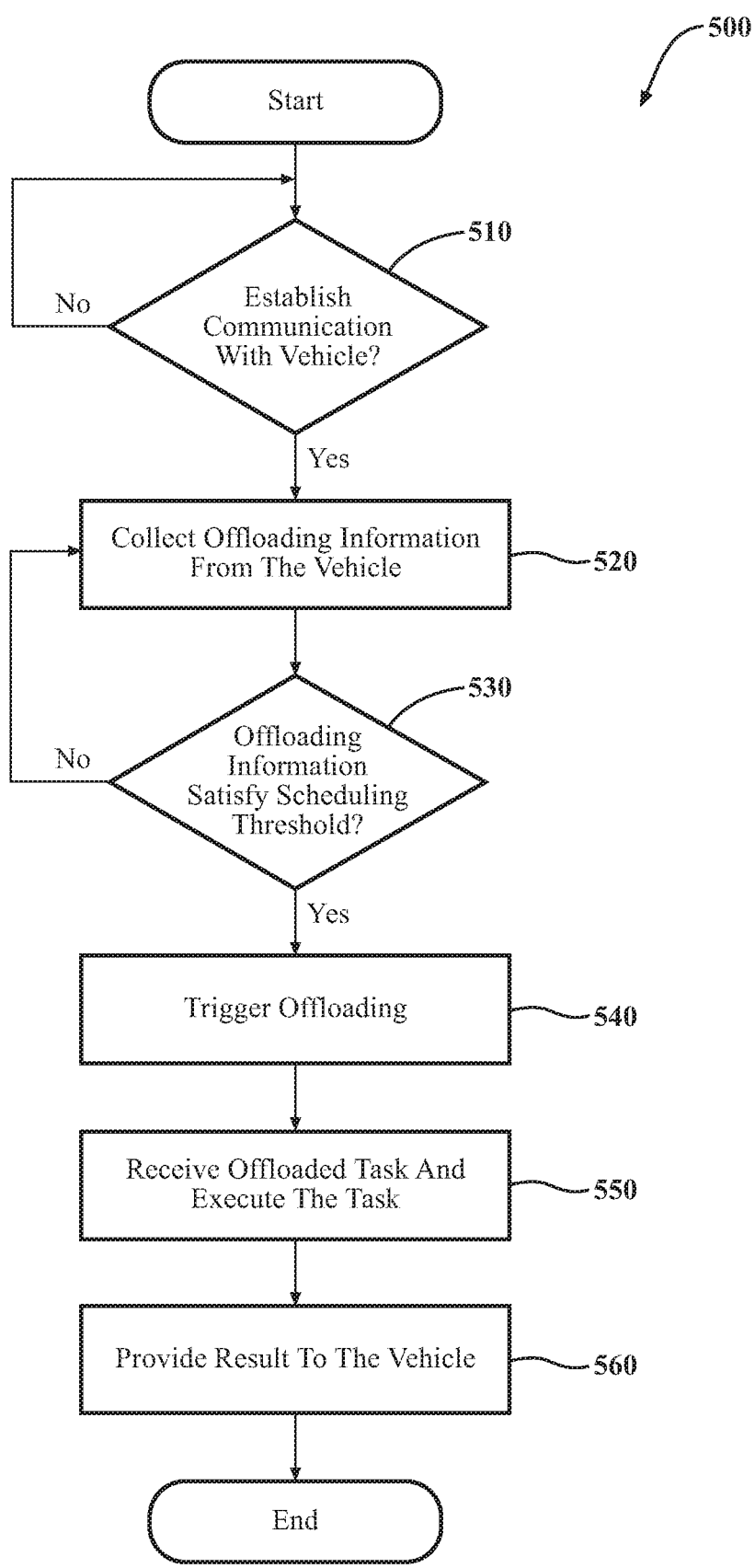
FIG. 5 is a flowchart illustrating one embodiment of a method associated with improving the scheduling of task offloading for a connected vehicle.

FIG. 5 illustrates a flowchart of a method 500 that is associated with improving the scheduling of offloading from a vehicle by an edge-computing device. Method 500 will be discussed from the perspective of the scheduling system 170 of FIGS. 1-2 as implemented by an edge-computing device, such as edge-computing device 410. While method 500 is discussed in combination with the scheduling system 170, it should be appreciated that the method 500 is not limited to being implemented within the scheduling system 170 but is instead one example of a system that may implement the method 500. Furthermore, while the method is illustrated as a generally serial process, various aspects of the method 500 can execute in parallel to perform the noted functions.

At 510, the sensor module 220 establishes communication with the vehicle 100. In one embodiment, the sensor module 220 of the edge-computing device establishes communication with the vehicle 100 by periodically providing a beacon message to which the vehicle 100 transmits a response. In further examples, the sensor module 220 of the edge-computing device establishes communication with the vehicle 100 as part of a handover from another infrastructure device, such as a nearby cellular communications device. In any case, because the vehicle 100 is generally moving between different areas with different communication and computing infrastructure, the scheduling system 170 initially establishes communication between the participating entities as a precursor to task offloading and scheduling.

At 520, the sensor module 220 collects the collected data 250 from the vehicle 100. As previously noted, the collected data 250 includes the offloading information and may further include an offloading request. Thus, in various approaches, the collected data 250 may be provided to the edge device at known intervals or simply with a task offloading request. In any case, the sensor module 220 of the edge-computing device acquires the collected data 250 in order to facilitate the scheduling.

At 530, the determination module 230 determines whether at least the context information satisfies a scheduling threshold. For example, in various approaches, the determination module 230 assesses the context information of the offloading information to determine when the noted aspects satisfy the scheduling threshold. In general, assessing the offloading information in relation to the scheduling threshold informs the determination module 230 about a priority (e.g., an immediacy) of an associated task that is to be offloaded. Thus, the scheduling threshold indicates threshold values for determining an immediacy of the vehicle task and a priority of the vehicle task relative to other queued tasks in the edge-computing device. For example, the determination module 230 may identify that the driver of the vehicle 100 is asleep, and thus the offloading information satisfies the scheduling threshold for driver behavior. Moreover, because the vehicular application is safety-related, the priority/immediacy of the task is generally considered high. Thus, other tasks may have lower defined priorities, and, thereby, the vehicle task may take precedent and be scheduled prior to the other tasks.

At 540, the determination module 230 triggers offloading of the vehicle task to the edge device when the offloading information (e.g., the context information, task information, etc.) satisfies the scheduling threshold. In at least one approach, triggering the offloading means that the scheduling system 170 schedules a time slot for the vehicle 100 to upload the task to the edge-computing device. In various implementations, the time slot may be immediate; however, in general, the determination module 230 selects time slot according to the priority of the vehicle task in relation to other tasks that the edge-computing device may already have queued.

In any case, the determination module 230 schedules the task offloading and may further schedule additional aspects, such as a time for executing the task, and/or a download time slot for the vehicle to receive the result from the edge device. In further embodiments, where the task is a request for data/information (e.g., HD map data), the determination module 230 may simply schedule a download time for providing the data to the vehicle 100. In this way, the scheduling system 170 can optimize available resources of the edge-computing environment including computational resources of the edge device(s) and communication bandwidth of the available infrastructure.

At 550, the determination module 230 receives the offloaded task at the scheduled time. Furthermore, the edge device may then proceed to immediately execute the task or wait until a selected execution time slot to execute the task. In any case, the determination module 230 schedules tasks in order to improve utilization of resources and executes the tasks, at least in part, in place of the vehicle 100 executing the task.

At 560, the determination module 230 provides a result of the edge device executing the vehicle task to the vehicle 100. In general, the result may be a simple determination or may include a more robust set of data to download to the vehicle 100. The form of the result generally depends on the application for which the edge device executes the task. Moreover, as previously noted, providing/downloading the result to the vehicle 100 may occur at a scheduled download time as defined when the scheduling original occurs.

Figure 6:
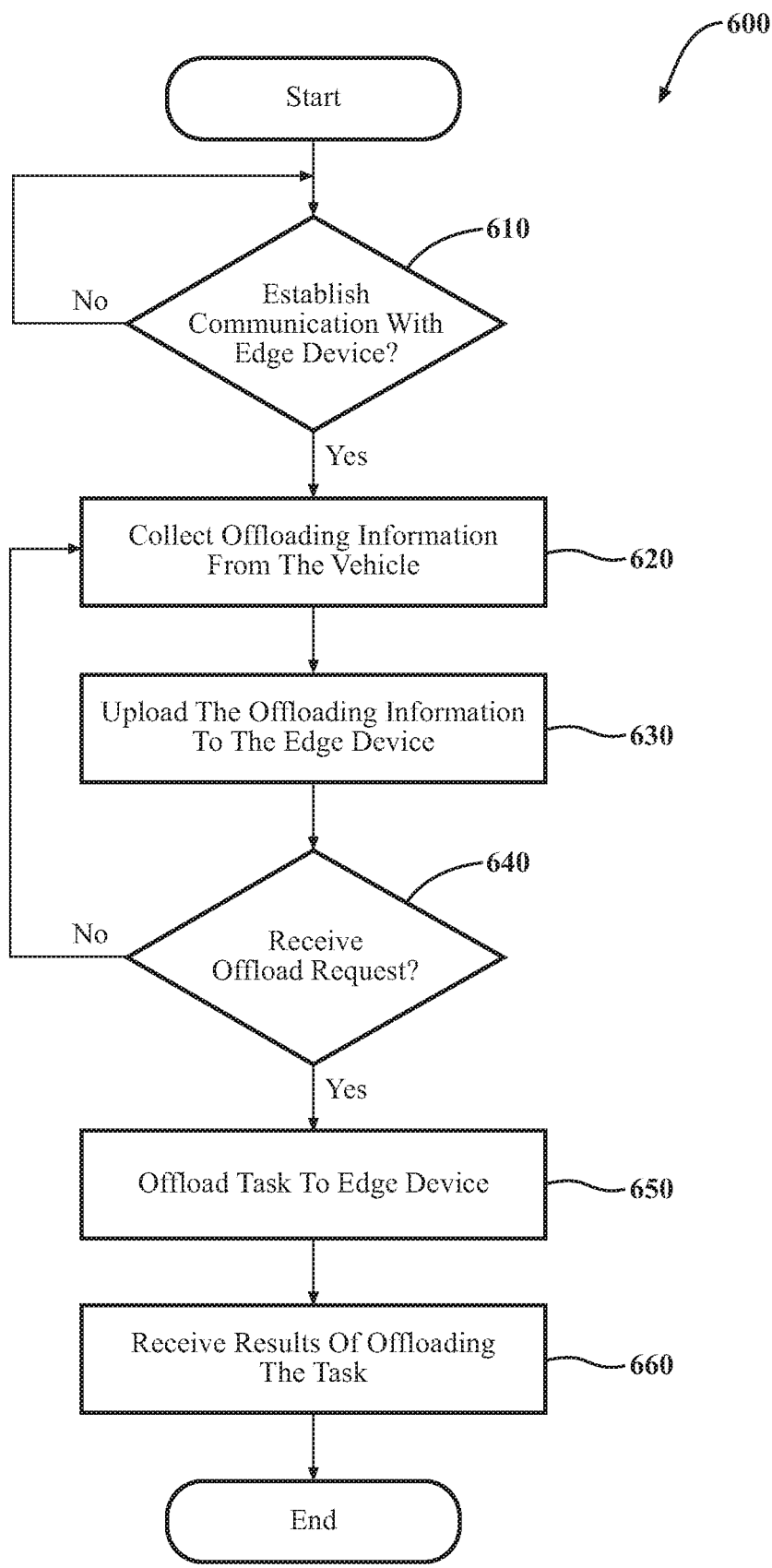
FIG. 6 is a flowchart illustrating one embodiment of a method associated with a connected vehicle that communicates with an edge device to offload tasks.

FIG. 6 illustrates a flowchart of a method 600 that is associated with improving the scheduling of offloading from a vehicle by an edge-computing device. Method 600 will be discussed from the perspective of the scheduling system 170 of FIGS. 1-2 as implemented by a vehicle, such as the vehicle 100. While method 600 is discussed in combination with the scheduling system 170, it should be appreciated that the method 600 is not limited to being implemented within the scheduling system 170 but is instead one example of a system that may implement the method 600. Furthermore, while the method is illustrated as a generally serial process, various aspects of the method 600 can execute in parallel to perform the noted functions.

At 610, the vehicle 100 establishes communication with the edge device using, for example, the communication system 180. In general, the vehicle 100 establishes the communications in a similar manner, as discussed previously at block 510 of method 500. Thus, for purposes of brevity, the discussion will not be repeated. However, it should be appreciated that the particular form of the communications may vary depending on the implementation and may occur independently or as part of communicating in a wide area network that includes many different base stations with local coverage.

At 620, the scheduling system 170 controls the sensor system 120 to acquire the collected data 250. As previously noted, the sensor module 220 may control many different sensors within the vehicle 100 and/or indirectly acquire information available through other means in the vehicle 100. In any case, the collected data 250 generally includes the task information about a particular task that is to offload to the edge-computing environment and context information about additional aspects relating to the operation of the vehicle 100. This information can further inform the edge device about scheduling the tasks to better utilize resources.

At 630, the sensor module 220 uploads the offloading information to the edge device to facilitate a determination of whether the vehicle task should be offloaded. As noted above, this offload may occur when the scheduling system 170 determines that a task is to be offloaded and as part of generating and communicating an offload request or as an iterative process that occurs regularly to maintain updated offloading information with the edge device.

At 640, the scheduling system 170 monitors for an offload request from the edge device to provide data for the task that is being offloaded. As shown in FIG. 6, this process may be iterative where the vehicle 100 provides the offloading information to the edge device in order to convey changes in the priority of the task. In either case, once the scheduling system 170 of the vehicle 100 receives the offload request from the edge device, then the process proceeds to offloading as shown at block 650.

At 650, the scheduling system 170 offloads the task to the edge device. In one or more arrangements, offloading the task includes communicating information about the task so that the edge device can perform the task on behalf of the vehicle 100. The information may include execution requirements and other metadata about the task in addition to data that is to be processed by the edge device to perform the task.

At 660, the vehicle 100 receives the results of the offloading. As previously noted, the results may be communicated to the vehicle 100 at a scheduled time or whenever the results are available. The manner in which the results are communicated may depend on current network congestion and the availability of bandwidth to provide the results. In any case, the scheduling system 170 of the vehicle 100 and the edge-computing device function cooperatively to achieve an intelligent scheduling scheme that improves the offloading process to better utilize available resources.

FIG. 1 will now be discussed in full detail as an example environment within which the system and methods disclosed herein may operate. In some instances, the vehicle 100 is configured to switch selectively between an autonomous mode, one or more semi-autonomous operational modes, and/or a manual mode. Of course, in further aspects, the vehicle 100 may be a manually driven vehicle that may or may not include one or more driving assistance systems, such as active cruise control, lane-keeping assistance, crash avoidance, and so on. In any case, "manual mode" means that all of or a majority of the navigation and/or maneuvering of the vehicle is performed according to inputs received from a user (e.g., human driver). In one or more arrangements, the vehicle 100 can be a conventional vehicle that is configured to operate in only a manual mode.

In one or more embodiments, the vehicle 100 is an autonomous vehicle. As used herein, "autonomous vehicle" refers to a vehicle that operates in an autonomous mode. "Autonomous mode" refers to navigating and/or maneuvering the vehicle 100 along a travel route using one or more computing systems to control the vehicle 100 with minimal or no input from a human driver. In one or more embodiments, the vehicle 100 is highly automated or completely automated. In one embodiment, the vehicle 100 is configured with one or more semi-autonomous operational modes in which one or more computing systems perform a portion of the navigation and/or maneuvering of the vehicle along a travel route, and a vehicle operator (i.e., driver) provides inputs to the vehicle to perform a portion of the navigation and/or maneuvering of the vehicle 100 along a travel route.

The vehicle 100 can include one or more processors 110. In one or more arrangements, the processor(s) 110 can be a main processor of the vehicle 100. For instance, the processor(s) 110 can be an electronic control unit (ECU). The vehicle 100 can include one or more data stores 115 for storing one or more types of data. The data store 115 can include volatile and/or non-volatile memory. Examples of suitable data stores 115 include RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The data store 115 can be a component of the processor(s) 110, or the data store 115 can be operatively connected to the processor(s) 110 for use thereby. The term "operatively connected," as used throughout this description, can include direct or indirect connections, including connections without direct physical contact.

In one or more arrangements, the one or more data stores 115 can include map data 116. The map data 116 can include maps of one or more geographic areas. In some instances, the map data 116 can include information or data on roads, traffic control devices, road markings, structures, features, and/or landmarks in the one or more geographic areas. The map data 116 can be in any suitable form. In some instances, the map data 116 can include aerial views of an area. In some instances, the map data 116 can include ground views of an area, including 360-degree ground views. The map data 116 can include measurements, dimensions, distances, and/or information for one or more items included in the map data 116 and/or relative to other items included in the map data 116. The map data 116 can include a digital map with information about road geometry. The map data 116 can be high quality and/or highly detailed.

In one or more arrangements, the map data 116 can include one or more terrain maps 117. The terrain map(s) 117 can include information about the ground, terrain, roads, surfaces, and/or other features of one or more geographic areas. The terrain map(s) 117 can include elevation data in the one or more geographic areas. The map data 116 can be high quality and/or highly detailed. The terrain map(s) 117 can define one or more ground surfaces, which can include paved roads, unpaved roads, land, and other things that define a ground surface.

In one or more arrangements, the map data 116 can include one or more static obstacle maps 118. The static obstacle map(s) 118 can include information about one or more static obstacles located within one or more geographic areas. A "static obstacle" is a physical object whose position does not change or substantially change over a period of time and/or whose size does not change or substantially change over a period of time. Examples of static obstacles include trees, buildings, curbs, fences, railings, medians, utility poles, statues, monuments, signs, benches, furniture, mailboxes, large rocks, hills. The static obstacles can be objects that extend above ground level. The one or more static obstacles included in the static obstacle map(s) 118 can have location data, size data, dimension data, material data, and/or other data associated with it. The static obstacle map(s) 118 can include measurements, dimensions, distances, and/or information for one or more static obstacles. The static obstacle map(s) 118 can be high quality and/or highly detailed. The static obstacle map(s) 118 can be updated to reflect changes within a mapped area.

The one or more data stores 115 can include sensor data 119. In this context, "sensor data" means any information about the sensors that the vehicle 100 is equipped with, including the capabilities and other information about such sensors. As will be explained below, the vehicle 100 can include the sensor system 120. The sensor data 119 can relate to one or more sensors of the sensor system 120. As an example, in one or more arrangements, the sensor data 119 can include information on one or more LIDAR sensors 124 of the sensor system 120.

In some instances, at least a portion of the map data 116 and/or the sensor data 119 can be located in one or more data stores 115 located onboard the vehicle 100. Alternatively, or in addition, at least a portion of the map data 116 and/or the sensor data 119 can be located in one or more data stores 115 that are located remotely from the vehicle 100.

As noted above, the vehicle 100 can include the sensor system 120. The sensor system 120 can include one or more sensors. "Sensor" means any device, component and/or system that can detect, and/or sense something. The one or more sensors can be configured to detect, and/or sense in real-time. As used herein, the term "real-time" means a level of processing responsiveness that a user or system senses as sufficiently immediate for a particular process or determination to be made, or that enables the processor to keep up with some external process.

In arrangements in which the sensor system 120 includes a plurality of sensors, the sensors can work independently from each other. Alternatively, two or more of the sensors can work in combination with each other. In such a case, the two or more sensors can form a sensor network. The sensor system 120 and/or the one or more sensors can be operatively connected to the processor(s) 110, the data store(s) 115, and/or another element of the vehicle 100 (including any of the elements shown in FIG. 1). The sensor system 120 can acquire data of at least a portion of the external environment of the vehicle 100 (e.g., nearby vehicles).

The sensor system 120 can include various types of sensor. Various examples of different types of sensors will be described herein. However, it will be understood that the embodiments are not limited to the particular sensors described. The sensor system 120 can include one or more vehicle sensors 121. The vehicle sensor(s) 121 can detect, determine, and/or sense information about the vehicle 100 itself. In one or more arrangements, the vehicle sensor(s) 121 can be configured to detect, and/or sense position and orientation changes of the vehicle 100, such as, for example, based on inertial acceleration. In one or more arrangements, the vehicle sensor(s) 121 can include one or more accelerometers, one or more gyroscopes, an inertial measurement unit (IMU), a dead-reckoning system, a global navigation satellite system (GNSS), a global positioning system (GPS), a navigation system 147, and/or other suitable sensors. The vehicle sensor(s) 121 can be configured to detect, and/or sense one or more characteristics of the vehicle 100. In one or more arrangements, the vehicle sensor(s) 121 can include a speedometer to determine a current speed of the vehicle 100.

Alternatively, or in addition, the sensor system 120 can include one or more environment sensors 122 configured to acquire, and/or sense driving environment data. "Driving environment data" includes data or information about the external environment in which an autonomous vehicle is located or one or more portions thereof. For example, the one or more environment sensors 122 can be configured to detect, quantify and/or sense obstacles in at least a portion of the external environment of the vehicle 100 and/or information/data about such obstacles. Such obstacles may be stationary objects and/or dynamic objects. The one or more environment sensors 122 can be configured to detect, measure, quantify and/or sense other things in the external environment of the vehicle 100, such as, for example, lane markers, signs, traffic lights, traffic signs, lane lines, crosswalks, curbs proximate the vehicle 100, off-road objects, etc.

Various examples of sensors of the sensor system 120 will be described herein. The example sensors may be part of the one or more environment sensors 122 and/or the one or more vehicle sensors 121. However, it will be understood that the embodiments are not limited to the particular sensors described.

As an example, in one or more arrangements, the sensor system 120 can include one or more radar sensors 123, one or more LIDAR sensors 124, one or more sonar sensors 125, and/or one or more cameras 126. In one or more arrangements, the one or more cameras 126 can be high dynamic range (HDR) cameras or infrared (IR) cameras.

The vehicle 100 can include an input system 130. An "input system" includes any device, component, system, element, or arrangement or groups thereof that enable information/data to be entered into a machine. The input system 130 can receive an input from a vehicle passenger (e.g., a driver or a passenger). The vehicle 100 can include an output system 135. An "output system" includes any device, component, or arrangement or groups thereof that enable information/data to be presented to a vehicle passenger (e.g., a person, a vehicle passenger, etc.).

The vehicle 100 can include one or more vehicle systems 140. Various examples of the one or more vehicle systems 140 are shown in FIG. 1. However, the vehicle 100 can include more, fewer, or different vehicle systems. It should be appreciated that although particular vehicle systems are separately defined, each or any of the systems or portions thereof may be otherwise combined or segregated via hardware and/or software within the vehicle 100. The vehicle 100 can include a propulsion system 141, a braking system 142, a steering system 143, throttle system 144, a transmission system 145, a signaling system 146, and/or a navigation system 147. Each of these systems can include one or more devices, components, and/or a combination thereof, now known or later developed.

The navigation system 147 can include one or more devices, applications, and/or combinations thereof, now known or later developed, configured to determine the geographic location of the vehicle 100 and/or to determine a travel route for the vehicle 100. The navigation system 147 can include one or more mapping applications to determine a travel route for the vehicle 100. The navigation system 147 can include a global positioning system, a local positioning system, or a geolocation system.

The processor(s) 110, and/or the autonomous driving module(s) 160 can be operatively connected to communicate with the various vehicle systems 140 and/or individual components thereof. For example, returning to FIG. 1, the processor(s) 110 and/or the autonomous driving module(s) 160 can be in communication to send and/or receive information from the various vehicle systems 140 to control the movement, speed, maneuvering, heading, direction, etc. of the vehicle 100. The processor(s) 110, and/or the autonomous driving module(s) 160 may control some or all of these vehicle systems 140 and, thus, may be partially or fully autonomous.

The processor(s) 110, and/or the autonomous driving module(s) 160 can be operatively connected to communicate with the various vehicle systems 140 and/or individual components thereof. For example, returning to FIG. 1, the processor(s) 110, and/or the autonomous driving module(s) 160 can be in communication to send and/or receive information from the various vehicle systems 140 to control the movement, speed, maneuvering, heading, direction, etc. of the vehicle 100. The processor(s) 110, and/or the autonomous driving module(s) 160 may control some or all of these vehicle systems 140.

The processor(s) 110, and/or the autonomous driving module(s) 160 may be operable to control the navigation and/or maneuvering of the vehicle 100 by controlling one or more of the vehicle systems 140 and/or components thereof. For instance, when operating in an autonomous mode, the processor(s) 110, and/or the autonomous driving module(s) 160 can control the direction and/or speed of the vehicle 100. The processor(s) 110, and/or the autonomous driving module(s) 160 can cause the vehicle 100 to accelerate (e.g., by increasing the supply of fuel provided to the engine), decelerate (e.g., by decreasing the supply of fuel to the engine and/or by applying brakes) and/or change direction (e.g., by turning the front two wheels). As used herein, "cause" or "causing" means to make, force, compel, direct, command, instruct, and/or enable an event or action to occur or at least be in a state where such event or action may occur, either in a direct or indirect manner.

The vehicle 100 can include one or more actuators 150. The actuators 150 can be any element or combination of elements operable to modify, adjust and/or alter one or more of the vehicle systems 140 or components thereof to responsive to receiving signals or other inputs from the processor(s) 110 and/or the autonomous driving module(s) 160. Any suitable actuator can be used. For instance, the one or more actuators 150 can include motors, pneumatic actuators, hydraulic pistons, relays, solenoids, and/or piezoelectric actuators, just to name a few possibilities.

The vehicle 100 can include one or more modules, at least some of which are described herein. The modules can be implemented as computer-readable program code that, when executed by a processor 110, implement one or more of the various processes described herein. One or more of the modules can be a component of the processor(s) 110, or one or more of the modules can be executed on and/or distributed among other processing systems to which the processor(s) 110 is operatively connected. The modules can include instructions (e.g., program logic) executable by one or more processor(s) 110. Alternatively, or in addition, one or more data store 115 may contain such instructions.

In one or more arrangements, one or more of the modules described herein can include artificial or computational intelligence elements, e.g., neural network, fuzzy logic or other machine learning algorithms. Further, in one or more arrangements, one or more of the modules can be distributed among a plurality of the modules described herein. In one or more arrangements, two or more of the modules described herein can be combined into a single module.

The vehicle 100 can include one or more autonomous driving modules 160. The autonomous driving module(s) 160 can be configured to receive data from the sensor system 120 and/or any other type of system capable of capturing information relating to the vehicle 100 and/or the external environment of the vehicle 100. In one or more arrangements, the autonomous driving module(s) 160 can use such data to generate one or more driving scene models. The autonomous driving module(s) 160 can determine the position and velocity of the vehicle 100. The autonomous driving module(s) 160 can determine the location of obstacles, obstacles, or other environmental features, including traffic signs, trees, shrubs, neighboring vehicles, pedestrians, etc.

The autonomous driving module(s) 160 can be configured to receive, and/or determine location information for obstacles within the external environment of the vehicle 100 for use by the processor(s) 110, and/or one or more of the modules described herein to estimate position and orientation of the vehicle 100, vehicle position in global coordinates based on signals from a plurality of satellites, or any other data and/or signals that could be used to determine the current state of the vehicle 100 or determine the position of the vehicle 100 with respect to its environment for use in either creating a map or determining the position of the vehicle 100 in respect to map data.

The autonomous driving module(s) 160 either independently or in combination with the scheduling system 170 can be configured to determine travel path(s), current autonomous driving maneuvers for the vehicle 100, future autonomous driving maneuvers and/or modifications to current autonomous driving maneuvers based on data acquired by the sensor system 120, driving scene models, and/or data from any other suitable source such as determinations from the sensor data. "Driving maneuver" means one or more actions that affect the movement of a vehicle. Examples of driving maneuvers include: accelerating, decelerating, braking, turning, moving in a lateral direction of the vehicle 100, changing travel lanes, merging into a travel lane, and/or reversing, just to name a few possibilities. The autonomous driving module(s) 160 can be configured to implement determined driving maneuvers. The autonomous driving module(s) 160 can cause, directly or indirectly, such autonomous driving maneuvers to be implemented. As used herein, "cause" or "causing" means to make, command, instruct, and/or enable an event or action to occur or at least be in a state where such event or action may occur, either in a direct or indirect manner. The autonomous driving module(s) 160 can be configured to execute various vehicle functions and/or to transmit data to, receive data from, interact with, and/or control the vehicle 100 or one or more systems thereof (e.g., one or more of vehicle systems 140).

Detailed embodiments are disclosed herein. However, it is to be understood that the disclosed embodiments are intended only as examples. Therefore, specific structural and functional details disclosed herein are not to be interpreted as limiting, but merely as a basis for the claims and as a representative basis for teaching one skilled in the art to variously employ the aspects herein in virtually any appropriately detailed structure. Further, the terms and phrases used herein are not intended to be limiting but rather to provide an understandable description of possible implementations. Various embodiments are shown in FIGS. 1-6, but the embodiments are not limited to the illustrated structure or application.

The flowcharts and block diagrams in the figures illustrate the architecture, functionality, and operation of possible implementations of systems, methods, and computer program products according to various embodiments. In this regard, each block in the flowcharts or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved.

The systems, components and/or processes described above can be realized in hardware or a combination of hardware and software and can be realized in a centralized fashion in one processing system or in a distributed fashion where different elements are spread across several interconnected processing systems. Any kind of processing system or another apparatus adapted for carrying out the methods described herein is suited. A typical combination of hardware and software can be a processing system with computer-usable program code that, when being loaded and executed, controls the processing system such that it carries out the methods described herein. The systems, components and/or processes also can be embedded in a computer-readable storage, such as a computer program product or other data programs storage device, readable by a machine, tangibly embodying a program of instructions executable by the machine to perform methods and processes described herein. These elements also can be embedded in an application product which comprises all the features enabling the implementation of the methods described herein and, which when loaded in a processing system, is able to carry out these methods.

Furthermore, arrangements described herein may take the form of a computer program product embodied in one or more computer-readable media having computer-readable program code embodied, e.g., stored, thereon. Any combination of one or more computer-readable media may be utilized. The computer-readable medium may be a computer-readable signal medium or a computer-readable storage medium. The phrase "computer-readable storage medium" means a non-transitory storage medium. A computer-readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer-readable storage medium would include the following: a portable computer diskette, a hard disk drive (HDD), a solid-state drive (SSD), a read-only memory (ROM), an erasable programmable read-only memory (EPROM or Flash memory), a portable compact disc read-only memory (CD-ROM), a digital versatile disc (DVD), an optical storage device, a magnetic storage device, or any suitable combination of the foregoing. In the context of this document, a computer-readable storage medium may be any tangible medium that can contain, or store a program for use by or in connection with an instruction execution system, apparatus, or device.

Generally, modules, as used herein, include routines, programs, objects, components, data structures, and so on that perform particular tasks or implement particular data types. In further aspects, a memory generally stores the noted modules. The memory associated with a module may be a buffer or cache embedded within a processor, a RAM, a ROM, a flash memory, or another suitable electronic storage medium. In still further aspects, a module as envisioned by the present disclosure is implemented as an application-specific integrated circuit (ASIC), a hardware component of a system on a chip (SoC), as a programmable logic array (PLA), or as another suitable hardware component that is embedded with a defined configuration set (e.g., instructions) for performing the disclosed functions.

Program code embodied on a computer-readable medium may be transmitted using any appropriate medium, including but not limited to wireless, wireline, optical fiber, cable, RF, etc., or any suitable combination of the foregoing. Computer program code for carrying out operations for aspects of the present arrangements may be written in any combination of one or more programming languages, including an object-oriented programming language such as Java™ Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The terms "a" and "an," as used herein, are defined as one or more than one. The term "plurality," as used herein, is defined as two or more than two. The term "another," as used herein, is defined as at least a second or more. The terms "including" and/or "having," as used herein, are defined as comprising (i.e., open language). The phrase "at least one of . . . and . . . " as used herein refers to and encompasses any and all possible combinations of one or more of the associated listed items. As an example, the phrase "at least one of A, B, and C" includes A only, B only, C only, or any combination thereof (e.g., AB, AC, BC or ABC).

Aspects herein can be embodied in other forms without departing from the spirit or essential attributes thereof. Accordingly, reference should be made to the following claims, rather than to the foregoing specification, as indicating the scope hereof.

What is claimed is:

1. A scheduling system for improving scheduling tasks within an edge-computing environment, comprising:
    one or more processors;
    a memory communicably coupled to the one or more processors and storing:
    a sensor module including instructions that when executed by the one or more processors cause the one or more processors to, upon establishing a communication connection with a vehicle by an edge device of the edge-computing environment, collect offloading information about the vehicle including task information describing at least a vehicle task that is to be offloaded to the edge device and context information about aspects relating to operation of the vehicle; and
    a determination module including instructions that when executed by the one or more processors cause the one or more processors to trigger offloading of the vehicle task to the edge device in response to determining that at least the context information satisfies a scheduling threshold,
    wherein the determination includes instructions to provide, by the edge device, a result of executing the vehicle task to the vehicle.

2. The scheduling system of claim 1, wherein the determination module includes instructions to trigger the offloading including instructions to schedule when the vehicle is to offload the vehicle task to the edge device and when the edge device is to execute the vehicle task.

3. The scheduling system of claim 1, wherein the determination module includes instructions to determine that at least the context information satisfies the scheduling threshold including instructions to determine priorities of queued tasks in comparison to the vehicle task according to the offloading information, wherein the context information includes at least driver behavior information and environmental information, and
    wherein the scheduling threshold indicates threshold values for determining an immediacy of the vehicle task and a priority of the vehicle task relative to the queued tasks.

4. The scheduling system of claim 1, wherein the determination module includes instructions to determine that the context information satisfies the scheduling threshold including instructions to define the scheduling threshold according to a history of prior scheduling events using the offloading information, and wherein the determination module includes instructions to trigger the offloading including instructions to collect the offloading information as additional history data to maintain one or more history databases about offload requests and scheduling of the offload requests.

5. The scheduling system of claim 1, wherein the context information includes driver behavior information and environment information,
    wherein the driver behavior information indicates current behaviors of a driver in relation to operation of the vehicle, wherein the environment information indicates behaviors of the vehicle and current conditions of a surrounding environment of the vehicle, and
    wherein the task information indicates characteristics of the vehicle task.

6. The scheduling system of claim 1, wherein the determination module includes instructions to trigger the offloading including instructions to schedule an upload time slot for the vehicle to communicate the vehicle task to the edge device and a download time slot for the vehicle to receive the result from the edge device.

7. The scheduling system of claim 1, wherein the sensor module includes instructions to collect offloading information about the vehicle including instructions to collect driver behavior information about how a driver has been controlling the vehicle and a current awareness of the driver in relation to operation of the vehicle.

8. The scheduling system of claim 1, wherein the context information includes driver behavior information identifying whether a driver is controlling the vehicle aggressively.

9. A non-transitory computer-readable medium storing instructions for improving scheduling tasks within an edge-computing environment and that when executed by one or more processors cause the one or more processors to:
    upon establishing a communication connection with a vehicle by an edge device of the edge-computing environment, collect offloading information about the vehicle including task information describing at least a vehicle task that is to be offloaded to the edge device and context information about aspects relating to operation of the vehicle;
    trigger offloading of the vehicle task to the edge device in response to determining that at least the context information satisfies a scheduling threshold; and
    provide, by the edge device, a result of executing the vehicle task to the vehicle.

10. The non-transitory computer-readable medium of claim 9, wherein the instructions to trigger the offloading include instructions to schedule when the vehicle is to offload the vehicle task to the edge device and when the edge device is to execute the vehicle task.

11. The non-transitory computer-readable medium of claim 9, wherein the instructions to determine that at least the context information satisfies the scheduling threshold include instructions to determine priorities of queued tasks in comparison to the vehicle task according to the offloading information, wherein the context information includes at least driver behavior information and environmental information, and wherein the scheduling threshold indicates threshold values for determining an immediacy of the vehicle task and a priority of the vehicle task relative to the queued tasks.

12. The non-transitory computer-readable medium of claim 9, wherein the instructions to determine that the context information satisfies the scheduling threshold include instructions to define the scheduling threshold according to a history of prior scheduling events using the offloading information, and wherein the instructions to trigger the offloading include instructions to collect the offloading information as additional history data to maintain one or more history databases about offload requests and scheduling of the offload requests.

13. The non-transitory computer-readable medium of claim 9, wherein the context information includes driver behavior information and environment information, wherein the driver behavior information indicates current behaviors of a driver in relation to operation of the vehicle, wherein the environment information indicates behaviors of the vehicle and current conditions of a surrounding environment of the vehicle, and wherein the task information indicates characteristics of the vehicle task.

14. A method for improving scheduling tasks within an edge-computing environment, comprising:

upon establishing a communication connection with a vehicle by an edge device of the edge-computing environment, collecting offloading information about the vehicle including task information describing at least a vehicle task that is to be offloaded to the edge device and context information about aspects relating to operation of the vehicle;

triggering offloading of the vehicle task to the edge device in response to determining that at least the context information satisfies a scheduling threshold; and providing, by the edge device, a result of executing the vehicle task to the vehicle.

15. The method of claim 14, wherein triggering the offloading includes scheduling when the vehicle is to offload the vehicle task to the edge device and when the edge device is to execute the vehicle task.

16. The method of claim 14, wherein determining that at least the context information satisfies the scheduling threshold includes determining priorities of queued tasks in comparison to the vehicle task according to the offloading information, wherein the context information includes at least driver behavior information and environmental information, and wherein the scheduling threshold indicates threshold values for determining an immediacy of the vehicle task and a priority of the vehicle task relative to the queued tasks.

17. The method of claim 14, wherein determining that the context information satisfies the scheduling threshold includes defining the scheduling threshold according to a history of prior scheduling events using the offloading information, and wherein triggering the offloading includes collecting the offloading information as additional history data to maintain one or more history databases about offload requests and scheduling of the offload requests.

18. The method of claim 14, wherein the context information includes driver behavior information and environment information, wherein the driver behavior information indicates current behaviors of a driver in relation to operation of the vehicle, wherein the environment information indicates behaviors of the vehicle and current conditions of a surrounding environment of the vehicle, and wherein the task information indicates characteristics of the vehicle task.

19. The method of claim 14, wherein triggering the offloading includes scheduling an upload time slot for the vehicle to communicate the vehicle task to the edge device and a download time slot for the vehicle to receive the result from the edge device.

20. The method of claim 14, wherein collecting offloading information about the vehicle includes collecting driver behavior information about how a driver has been controlling the vehicle and a current awareness of the driver in relation to operation of the vehicle.

* * * * *